United States Patent
Batson et al.

(10) Patent No.: US 8,584,618 B1
(45) Date of Patent: Nov. 19, 2013

(54) PET CARRIER

(71) Applicants: Claudette Batson, Newark, NJ (US);
Claudia A. Batson, Newark, NJ (US)

(72) Inventors: Claudette Batson, Newark, NJ (US);
Claudia A. Batson, Newark, NJ (US)

(*) Notice: Subject to any disclaimer, the term of this patent is extended or adjusted under 35 U.S.C. 154(b) by 0 days.

(21) Appl. No.: 13/645,905

(22) Filed: Oct. 5, 2012

(51) Int. Cl.
*A01K 1/03* (2006.01)

(52) U.S. Cl.
USPC .......................................... 119/496

(58) Field of Classification Search
USPC ................... 119/496, 497, 453, 454
See application file for complete search history.

(56) References Cited

U.S. PATENT DOCUMENTS

| | | | | |
|---|---|---|---|---|
| 5,694,886 | A * | 12/1997 | Hauck | 119/497 |
| 6,223,691 | B1 * | 5/2001 | Beattie | 119/453 |
| D469,929 | S | 2/2003 | Licciardello | |
| 7,210,426 | B2 * | 5/2007 | Yeung | 119/497 |
| 7,261,060 | B1 * | 8/2007 | Garofola et al. | 119/496 |
| D569,049 | S | 5/2008 | Lin | |
| 7,568,450 | B2 * | 8/2009 | Chen | 119/496 |
| D616,612 | S | 5/2010 | Lu | |
| 2003/0116098 | A1 * | 6/2003 | Chrisco et al. | 119/496 |
| 2005/0284404 | A1 | 12/2005 | Pomakoy-Poole et al. | |
| 2005/0284405 | A1 * | 12/2005 | Pomakoy-Poole et al. | 119/497 |
| 2006/0278173 | A1 * | 12/2006 | Kamijo | 119/496 |
| 2007/0169719 | A1 * | 7/2007 | Chang | 119/496 |
| 2007/0221136 | A1 | 9/2007 | Buttner | |
| 2009/0118869 | A1 | 5/2009 | Cauchy et al. | |
| 2009/0205578 | A1 | 8/2009 | Alves | |
| 2009/0314219 | A1 | 12/2009 | Bryson | |
| 2010/0139573 | A1 * | 6/2010 | Wilson et al. | 119/496 |
| 2010/0192870 | A1 | 8/2010 | Wood | |

* cited by examiner

*Primary Examiner* — Son T Nguyen

(57) ABSTRACT

The present invention features a pet carrier with handle and wheels. The carrier comprises a cage, a removable top cover, a cage base and a removably attached handle. The cage has a pivotable front door with ventilation slots and door lock. The removable top cover has a bubble shape and is transparent with a picture slot for pet picture or other relevant information. The cage base has a plurality of retractable wheels with each wheel connected to the bottom side of the cage via a support leg and a hinge. The cage has male and female clip connector to connect to a removable strap component, which can also be used to secure the pet within a vehicle. The carrier also comprises a removable handle to be used to push the carrier.

14 Claims, 8 Drawing Sheets

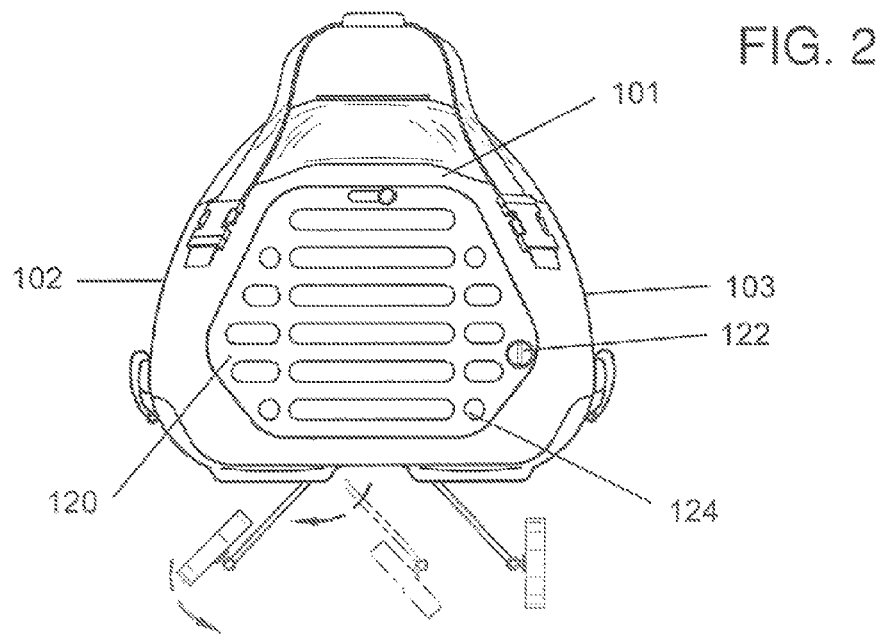
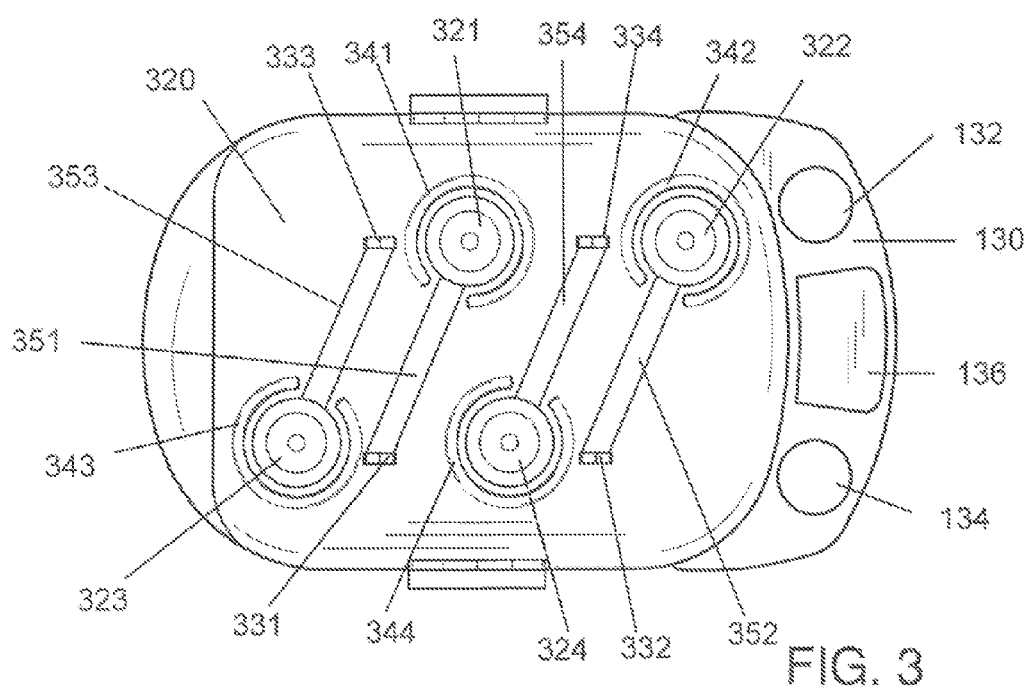

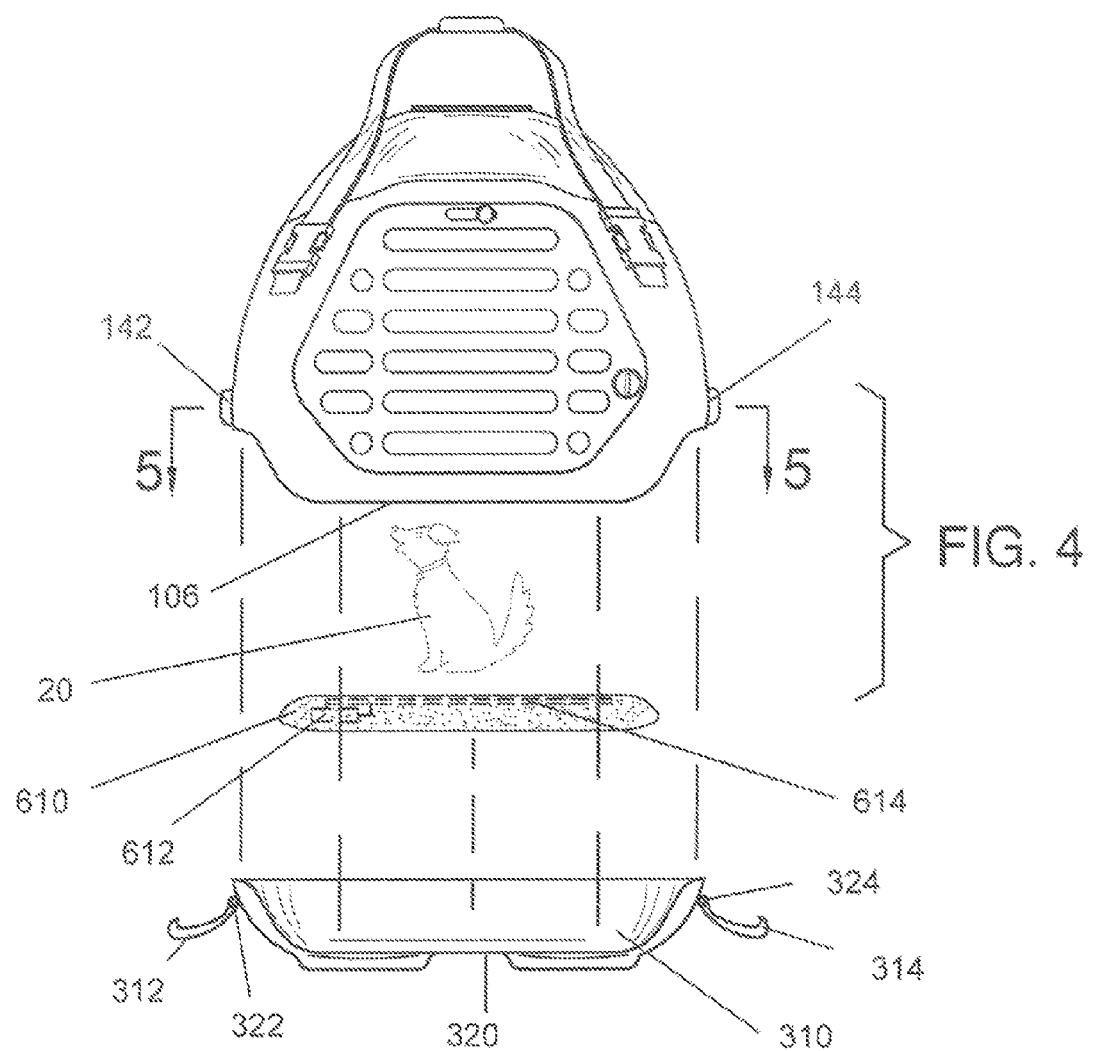

PET CARRIER

FIELD OF THE INVENTION

The present invention related to a pet carrier, and more particularly to a pet carrier with handle and wheels.

BACKGROUND OF THE INVENTION

Pet carriers are used for carrying and enclosing pets such as dogs, cats, etc. There is always a need for a pet carrier with improved combination of pet safety, convenience and security.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a pet carrier with handle and wheels. The carrier comprises a cage, a removable top cover, a cage base and a removably attached handle. The cage has a pivotable front door with ventilation slots and door lock. The removable top cover has a bubble shape and is transparent with a picture slot for pet picture or other relevant information. The cage base has a plurality of retractable wheels with each wheel connected to the bottom side of the cage via a support leg and a hinge. The cage has male and female clip connector to connect to a removable strap component, which can also be used to secure the pet within a vehicle. The carrier also comprises a removable handle to be used to push the carrier.

BRIEF DESCRIPTION OF THE DRAWINGS

FIG. 2 shows a site view of the pet carrier system.
FIG. 3 shows a bottom view of the pet carrier system.
FIG. 4 shows a component view of the pet carrier system.

DESCRIPTION OF PREFERRED EMBODIMENTS

Figure 1:
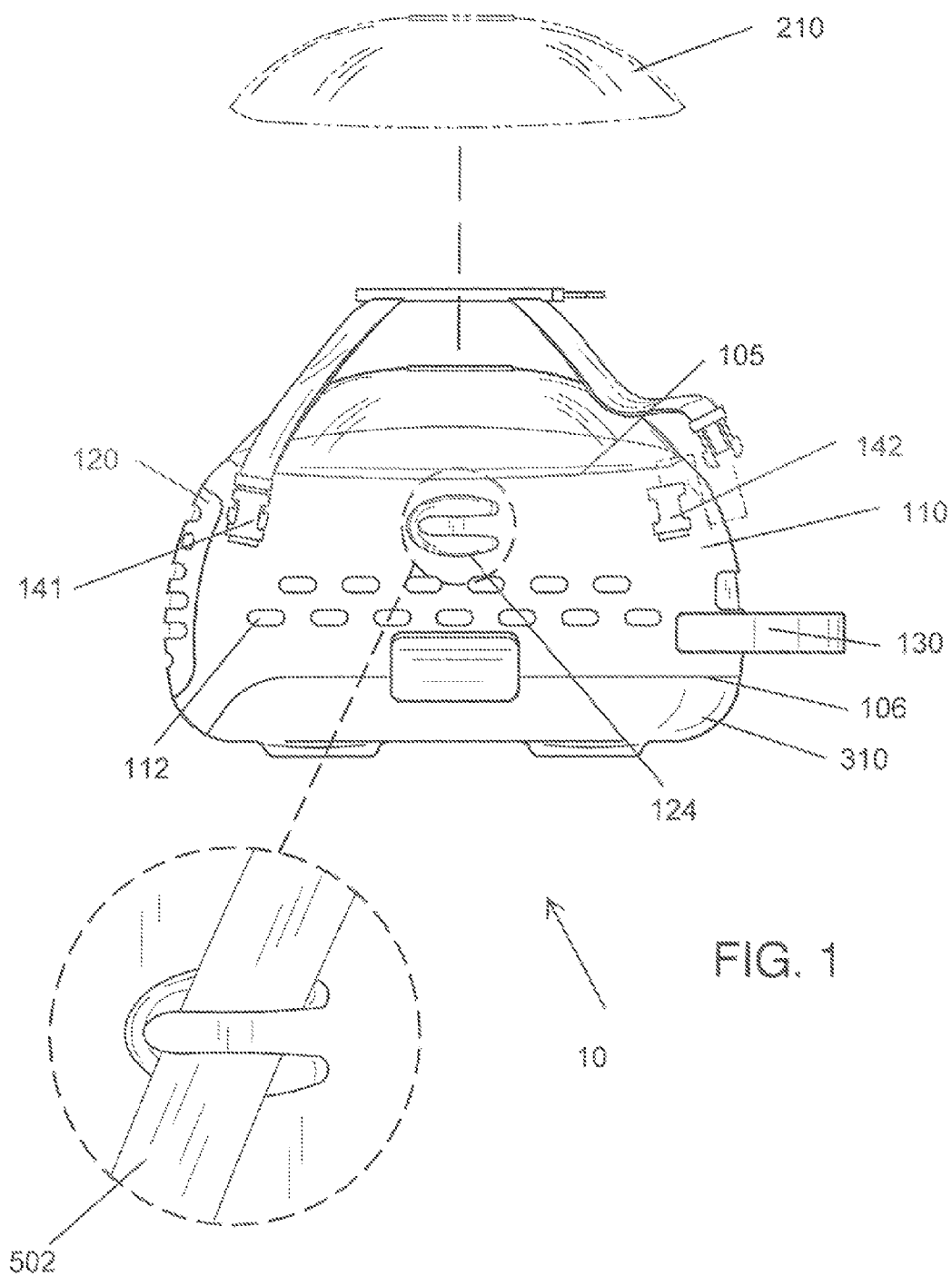
FIG. 1 shows a side view of a pet carrier system.
Figure 1A:
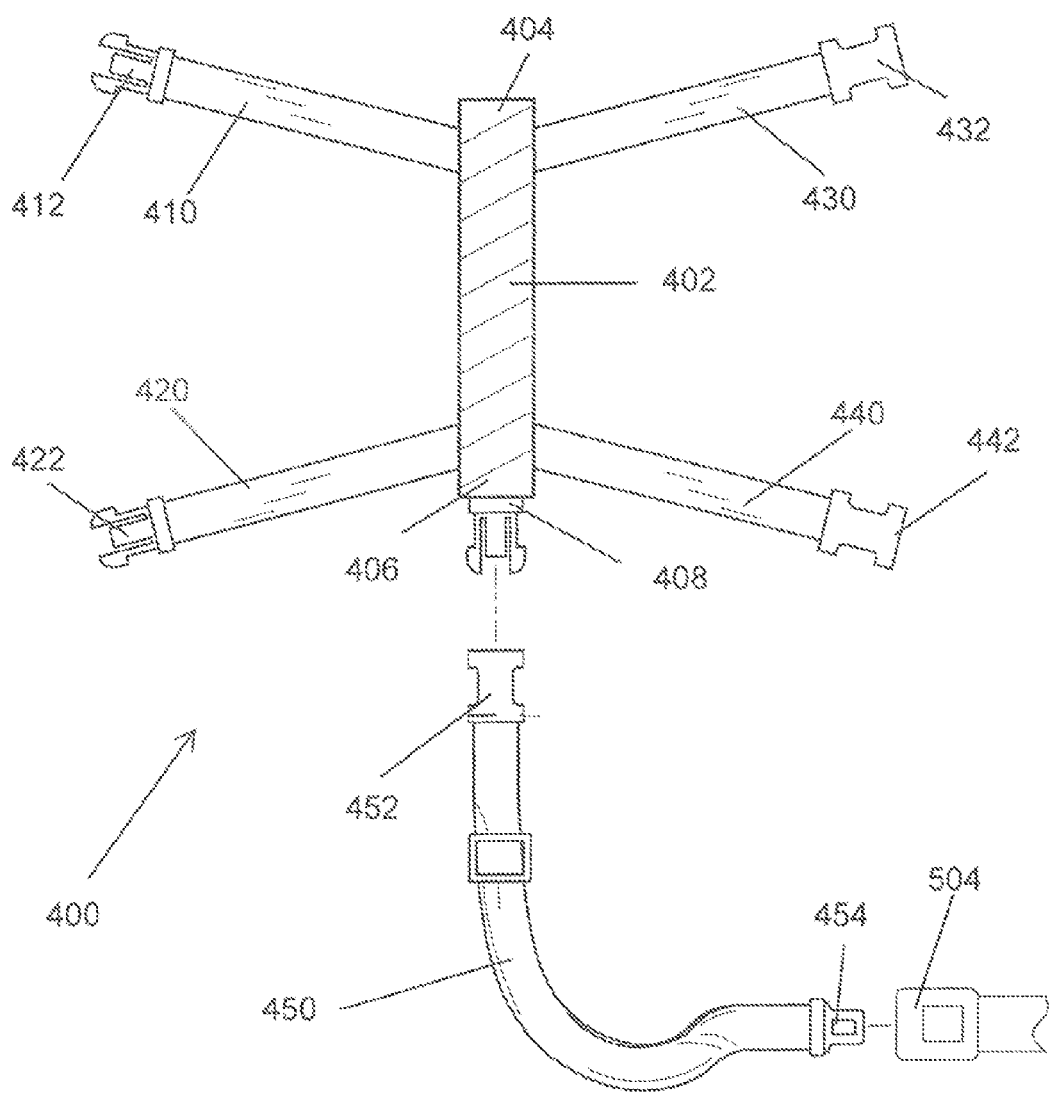
FIG. 1A shows a detailed view of the strap component.
Figure 5:
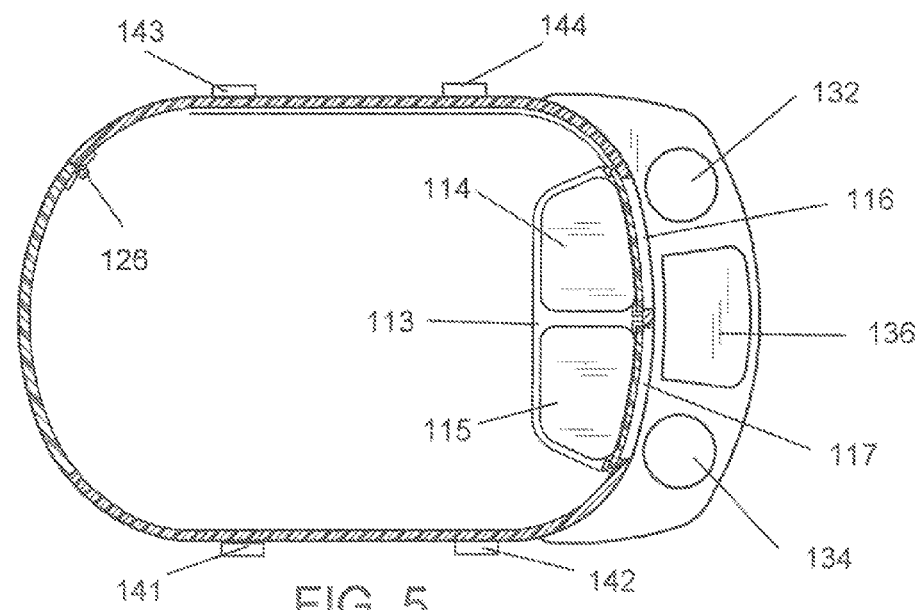
FIG. 5 shows a cross-sectional view of the pet carrier system.
Figure 6:
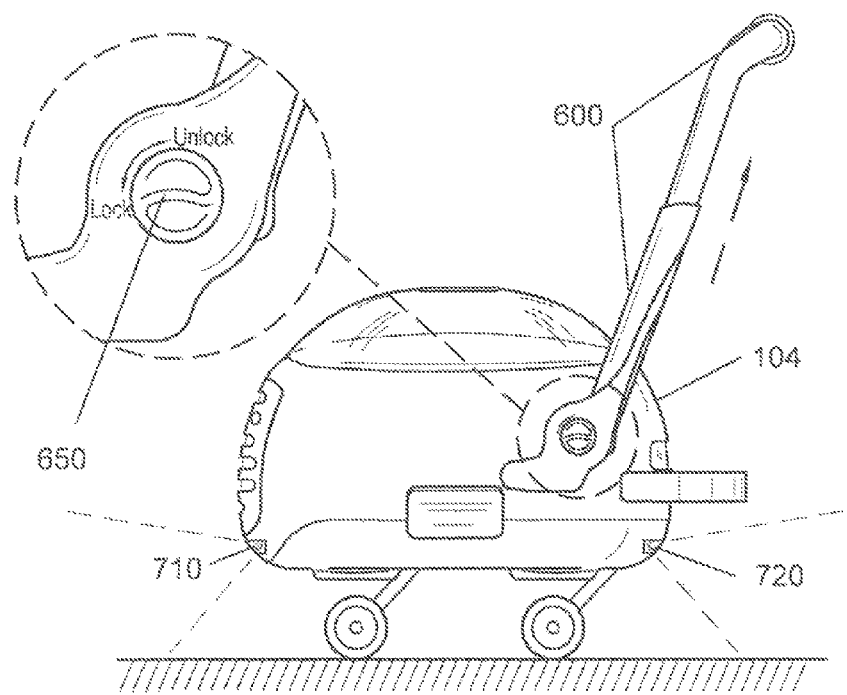
FIG. 6 shows a side view with a removable handle of the pet carrier system.
Figure 7:
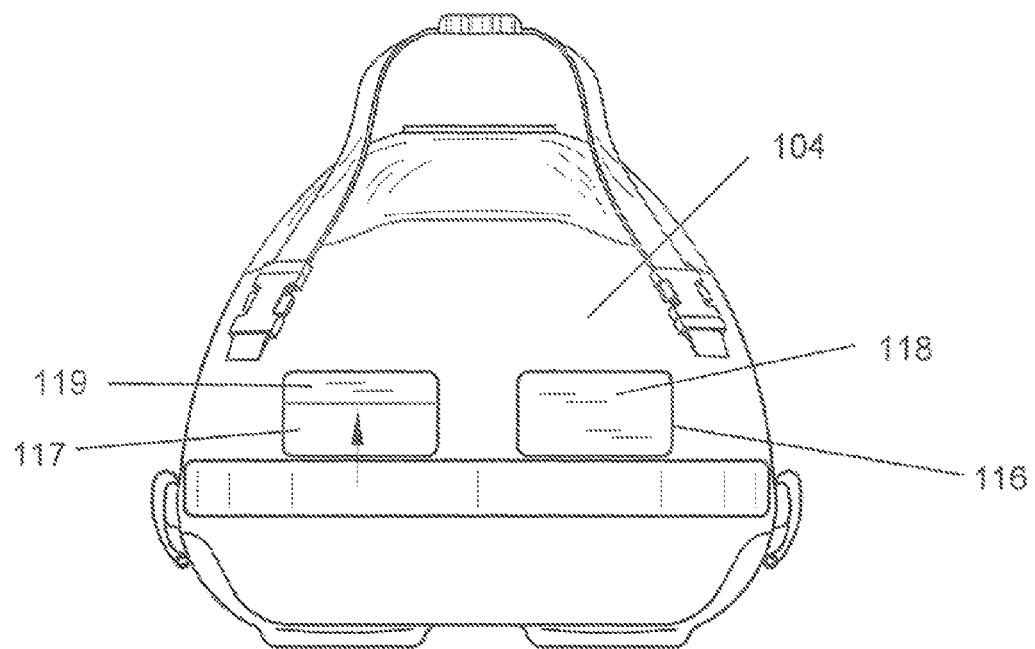
FIG. 7 shows a back view of the pet carrier system.
Figure 8:
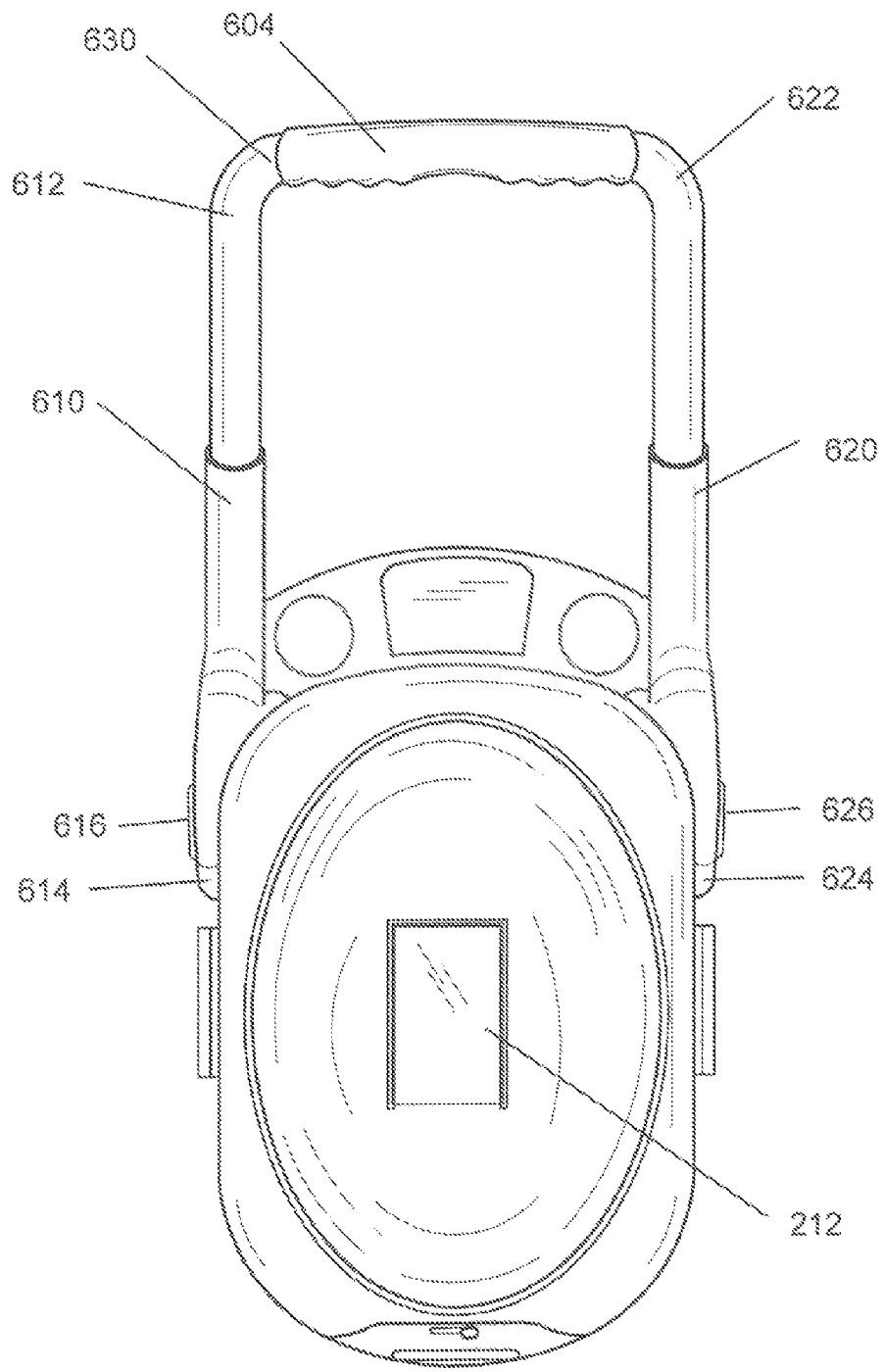
FIG. 8 shows a top view of the pet carrier system.
Figure 9:
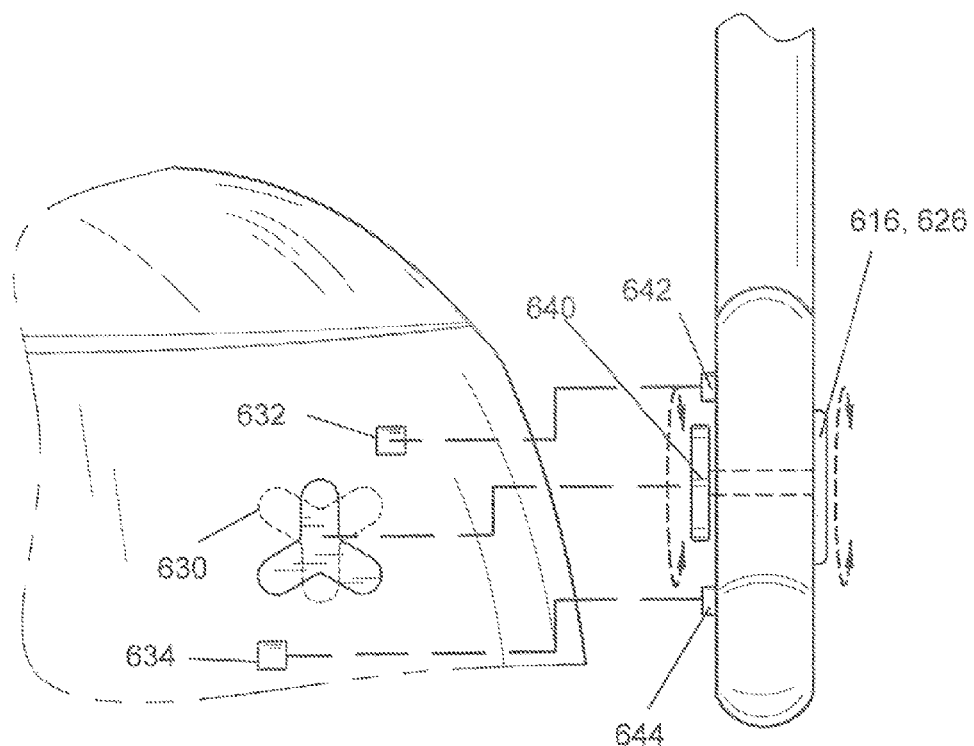
FIG. 9 shows a section describing the mechanics of the invention.

Referring now to FIG. 1-9, the present invention features a pet carrier with handle and wheels. The pet carrier system (10) comprises a pet cage (110), a removable lid (210), a cage base (310), a strap component (400), a seatbelt connection strap (450) and a removably attached handle (600). The cage has a pivotal front door with ventilation slots and door lock. The removable top cover has a bubble shape and is transparent with a picture slot for pet picture or other relevant information. The cage base has a plurality of retractable wheels with each wheel connected to the bottom side of the cage via a support leg and a hinge. The cage has male and female clip connector to connect to a removable strap component, which can also be used to secure the pet within a vehicle. The carrier also comprises a removable handle to be used to push the carrier.

The cage (110) comprises a front door (120) pivotably attached to the front door (120) via at least a hinge (126), wherein door lock (122) and a plurality of ventilation slots or holes (124) disposed on the door (120). The cage (110) also comprises a food holder (113) disposed within the cage on the back side (104), wherein the holder (113) comprises at least one section (114) for food and one section (115) for water. In some embodiments, a first female clip (141) and second female clip (142) disposed on the first side (102), wherein the first female clip (141) is disposed near the front side (101) and the second female clip (142) is disposed near the back side (104). In some embodiments, a first male clip (143) and second female clip (144) disposed on the second side (103), wherein the first male clip (143) is disposed near the front side (101) and the second male clip (144) is disposed near the back side (104).

The lid is adaptive to fit the top opening (105) of the cage (110). In some embodiments, the lid (210) is transparent or semi-transparent so that a user can view the pet situation inside the cage. In some embodiments, the lid (210) has a slot (212) for the insertion of picture or pet identification information. In some embodiments, the lid (210) has a bubble shape for more headroom for the pet.

A cage base (310) is removably attached to the cage by a first hook (312) and second hook (314), wherein the base is adaptive to fit the bottom opening (106) of the cage (110), wherein the first hook (312) is pivotably attached to the base via a first side hinge (322) and fastens to a first bulge (142) disposed on the first side (102) on the pet cage (110), wherein the second hook (314) is pivotably attached to the base via a second side hinge (324) and fastens to a second bulge (144) disposed on the second side (103) on the pet cage (110), wherein a plurality of wheels are attached to the bottom side (320) of the cage base.

A strap component (400) comprises a grip (402) and four straps, wherein the grip (402) has a first end (404) and second end (406), wherein a first strap (410) is attached to the grip near the first end (404), wherein a second strap (420) is attached to the grip near the second end (406), wherein a third strap (430) is attached to the grip near the first end (404), wherein a fourth strap (440) is attached to the grip near the first end (406), wherein the first strap (410) and the third strap (430) are on the same side of the grip (402), wherein the second strap (410) and the third strap (430) are on opposite side of the grip (402) from the first strap (410), wherein the first strap (410) has a male clip (412) disposed on the distal end, wherein the second strap (420) has a male clip (422) disposed on the distal end, wherein the third strap (430) has a female clip (413) disposed on the distal end, wherein the fourth strap (440) has a female clip (442) disposed on the distal end, wherein a grip male clip (408) is disposed on the second end (406) of the grip (402).

In some embodiments, the system comprises a seatbelt connection strap (450) with a female clip (452) on one end and a seatbelt tongue connector (454) on the other end, wherein the strap (450) has an adjustable length.

the male clip (412) on the first strap (410) connects the first female clip (141) on the pet cage (110), the male clip (422) on the second strap (420) connects the second female clip (142) on the pet cage (110), the female clip (432) on the third strap (430) connects the first male clip (143) on the pet cage (110), the female clip (442) on the fourth strap (440) connects the second male clip (143) on the pet cage (110), such that a user is able to lift the pet cage by lifting the grip (402).

When the pet (20) is taken out from the cage and is transported inside a vehicle, the strap component (400) is disconnected from the pet cage, the male clip (412) on the first strap (410) crossed over the pet's chest and subsequently connects the female clip (442) of the fourth strap (440), the male clip (422) on the second strap (420) crossed over the pet's chest and subsequently connects the female clip (432) of the third strap (430), the grip male clip (408) connects to the female clip (452) of seatbelt connection strap (450) and the seatbelt tongue connector (454) connects to a desired vehicle seat buckle (504) to secure the pet within the vehicle.

In some embodiments, the pet cage (110) further comprises a first slot (116) and second (117) disposed on the back side (104) of the cage, wherein the slots are positioned above the food holder (113) disposed inside the cage, wherein the first slot (116) is adjacent to the first section (114) of the food holder (113) and the second slot (118) is adjacent to the second section (115) of the food holder (113), wherein the first slot (116) has a sliding shade (118) and the second slot (117) has a sliding shade (119), wherein the shades slid up to open the slot to allow food or water reload from outside into the food holder and slip down to close the slot after food/water reloading.

In some embodiments, the system further comprises a removable pad (610) disposed within the cage and above the base. In some embodiments, the padding (610) has heat via heating elements (614) imbedded inside the pad, wherein the heating element is powered by battery (612) disposed within the pad.

In some embodiments, four wheels are attached to the bottom side (320) of the cage base (310), wherein a first support leg (351) is pivotably attached to the bottom side (320) via a first base hinge (331) with the proximal end of the first support leg connected to the hinge and distal end of the first support leg connected to a first wheel (321), wherein a second support leg (352) is pivotably attached to the bottom side (320) via a second base hinge (332) with the proximal end of the second support leg connected to the second hinge and distal end of the second support leg connected to a second wheel (322), wherein a third support leg (353) is pivotably attached to the bottom side (320) via a third base hinge (333) with the proximal end of the third support leg connected to the hinge and distal end of the third support leg connected to a third wheel (323), wherein a fourth support leg (354) is pivotably attached to the bottom side (320) via a fourth base hinge (334) with the proximal end of the fourth support leg connected to the hinge and distal end of the fourth support leg connected to a fourth wheel (324), wherein the first base hinge (331) and third base hinge (333) are near the front side (101) of the pet cage (110) and the first base hinge (331) is opposite to the third base hinge (333), wherein the second base hinge (332) and fourth base hinge (334) are near the back side (104) of the pet cage (110) and the second base hinge (332) is opposite to the fourth base hinge (334), wherein the first base hinge (331) and the second base hinge (332) is aligned, wherein the third base hinge (333) and the fourth base hinge (334) is aligned; wherein the four wheels are pivotably moved between a retracted position and a deployed position, wherein in retracted position, the wheels are retracted to contact the bottom side (320), wherein in deployed position, the wheels are deployed to perpendicular to the bottom side (320) such that the pet carrier (10) can be pushed or dragged via the wheels.

In some embodiments, a first circular rim (341), a second circular rim (342), a third circular rim (343) and a fourth circular rim (344) are disposed on the bottom side (320), wherein when the wheels are in retracted position, the first wheel is stored within the first rim, the second wheel stored within the second rim, the third wheel is stored within the third rim and the fourth wheel is stored within the fourth rim, wherein each rim has a small groove to fit the support legs when the wheels are in retracted position.

In some embodiments, the pet carrier system further comprises a removable handle (600), wherein the handle is a U-shape bracket with a first arm (610), a second arm (620) and a connecting arm (630), wherein the first arm (610) and second arm (620) have adjustable length with telescope means, wherein the first arm (610) has a proximal end (612) and distal end (614), wherein the second arm (620) has a proximal end (622) and distal end (624), wherein a connecting arm (630) connects the proximal end of the first arm to the proximal end of the second arm, wherein the distal end (614) of the first arm (610) is removable attached to the pet cage (110) with a first adjust knob (616), wherein the distal end (624) of the second arm (620) is removably attached to the pet cage (110) with a second adjust knob (626), wherein the knob is coaxially connected to a latch (640), wherein the latch is able to enter a slot (630) disposed on the first side and second side of the pet cage with a certain angle only, wherein after the insertion of the latch (640), the adjust knob (616 or 626) is rotated to a different angle such that the latch (640) is trapped inside the pet cage and thus hold the first arm and second arm, wherein an additional first dent (632) and second dent (634) are disposed on the first side/second side of the pet cage, wherein the first dent (632) and second dent (634) are adaptive to snuggly receive the first knob (642) and second knob (644) such that the first/second arm is securely attached to the pet cage.

In some embodiments, the connecting arm (630) has a rubber grip layer (604) to enhance the grip when a user pushes the pet carrier.

In some embodiments, the pet carrier system further comprises an external cup holder (130) attached on the back side (104) of the pet cage (110), wherein the cup holder (130) comprises a first circular cavity (132), a second circular cavity (134) and a third cavity (136) disposed between the first circular cavity (132) and a second circular cavity (134).

In some embodiments, the pet carrier system further comprises at least one recessed seat belt hook (124), wherein the recessed seat belt hook (124) is disposed on the first side, or second side or both sides of the pet cage (110), wherein the recessed seat belt hook (124) is adaptive to receive a vehicle's seat belt (502) such that the pet carrier itself is able to be secured within vehicle using the vehicle's seat belt.

In some embodiments, the pet carrier system further comprises at least one LED light (710) disposed on the pet cage (110) on the front side (101) or at least one LED light (720) disposed on the cage base (310). The LED light is powered by batteries disposed inside the pet cage (110) and/or the cage base (310).

As used herein, the term "about" refers to plus or minus 10% of the referenced number.

The disclosures of the following U.S. Patents are incorporated in their entirety by reference herein: U.S. Patent Document: US patent application publication 2005/0284404, US patent application publication 2007/0221136, US patent application publication 2009/0118869, US patent application publication 2009/0205578, US patent application publication 2010/0192870, U.S. Pat. No. D469,929, U.S. Pat. No. D569,049, and U.S. Pat. No. D616,612.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A pet carrier system (10) for a pet (20) with handle, wheels and grip, wherein the carrier comprises:
   (a) a pet cage (110) with a front side (101), a first side (102), a second side (103), a back side (104), a top opening (105) and a bottom opening (106), wherein the cage (110) comprises:
      (i) a front door (120) pivotably attached to the front side (101) via at least a hinge (126), wherein door lock (122) and a plurality of ventilation slots or holes (124) disposed on the door (120);
      (ii) a food holder (113) disposed within the cage on the back side (104), wherein the holder (113) comprises at least one section (114) for food and one section (115) for water;
      (iii) a first female clip (141) and second female clip (142) disposed on the first side (102), wherein the first female clip (141) is disposed near the front side (101) and the second female clip (142) is disposed near the back side (104);
      (iv) a first male clip (143) and second female clip (144) disposed on the second side (103), wherein the first male clip (143) is disposed near the front side (101) and the second male clip (144) is disposed near the back side (104);
   (b) a lid (210), wherein the lid is adaptive to fit the top opening (105) of the cage (110);
   (c) a cage base (310) inside which the pet is placed, wherein the base is removably attached to the cage by a first hook (312) and second hook (314), wherein the base is adaptive to fit the bottom opening (106) of the cage (110), wherein the first hock (312) is pivotably attached to the base via a first side hinge (322) and fastens to a first bulge (142) disposed on the first side (102) on the pet cage (110), wherein the second hook (314) is pivotably attached to the base via a second side hinge (324) and fastens to a second bulge (144) disposed on the second side (103) on the pet cage (110), wherein a plurality of wheels are attached to the bottom side (320) of the cage base;
   (d) a strap component (400), wherein the component (400) comprises a grip (402) and four straps, wherein the grip (402) has a first end (404) and second end (406), wherein a first strap (410) is attached to the grip near the first end (404), wherein a second strap (420) is attached to the grip near the second end (406), wherein a third strap (430) is attached to the grip near the first end (404), wherein a fourth strap (440) is attached to the grip near the first end (406), wherein the first strap (410) and the third strap (430) are on the same side of the grip (402), wherein the second strap (410) and the third strap (430) are on opposite side of the grip (402) from the first strap (410), wherein the first strap (410) has a male clip (412) disposed on the distal end, wherein the second strap (420) has a female clip (422) disposed on the distal end, wherein the third strap (430) has a female clip (413) disposed on the distal end, wherein the fourth strap (440) has a female clip (442) disposed on the distal end, wherein a grip male clip (408) is disposed on the second end (406) of the grip (402);
   (e) a seatbelt connection strap (450) with a female clip (452) on one end and a seatbelt tongue connector (454) on the other end, wherein the strap (450) has an adjustable length;
wherein the male clip (412) on the first strap (410) connects the first female clip (141) on the pet cage (110), the male clip (422) on the second strap (420) connects the second female clip (142) on the pet cage (110), the female clip (432) on the third strap (430) connects the first male clip (143) on the pet cage (110), the female clip (442) on the fourth strap (440) connects the second male clip (143) on the pet cage (110), such that a user is able to lift the pet cage by lifting the grip (402); and
wherein when the pet (20) is taken out from the cage and is transported inside a vehicle, the strap component (400) is disconnected from the pet cage, the male clip (412) on the first strap (410) crossed over the pet's chest and subsequently connects the female clip (442) of the fourth strap (440), the male clip (422) on the second strap (420) crossed over the pet's chest and subsequently connects the female clip (432) of the third strap (430), the grip male clip (408) connects to the female clip (452) of seatbelt connection strap (450) and the seatbelt tongue connector (454) connects to a desired vehicle seat buckle (504) to secure the pet within the vehicle.

2. The system of claim 1, wherein the lid (210) is transparent or semi-transparent.

3. The system of claim 1, wherein the lid (210) has a slot (212) for the insertion of picture or pet identification information.

4. The system of claim 1, wherein the lid (210) has a bubble shape.

5. The system of claim 1, wherein the pet cage (110) further comprises a first slot (116) and second (117) disposed on the back side (104) of the cage, wherein the slots are positioned above the food holder (113) disposed inside the cage, wherein the first slot (116) is adjacent to the first section (114) of the food holder (113) and the second slot (118) is adjacent to the second section (115) of the food holder (113), wherein the first slot (116) has a sliding shade (118) and the second slot (117) has a sliding shade (119), wherein the shades slid up to open the slot to allow food or water reload from outside into the food holder and slip down to close the slot after food/water reloading.

6. The system of claim 1, wherein the system further comprises a removable pad (610) disposed within the cage and above the base.

7. The system of claim 6, wherein the padding (610) has heat via heating elements (614) imbedded inside the pad, wherein the heating element is powered by battery (612) disposed within the pad.

8. The system of claim 1, wherein four wheels are attached to the bottom side (320) of the cage base (310), wherein a first support leg (351) is pivotably attached to the bottom side (320) via a first base hinge (331) with the proximal end of the first support leg connected to the hinge and distal end of the first support leg connected to a first wheel (321), wherein a second support leg (352) is pivotably attached to the bottom side (320) via a second base hinge (332) with the proximal end of the second support leg connected to the second hinge and distal end of the second support leg connected to a second wheel (322), wherein a third support leg (353) is pivotably attached to the bottom side (320) via a third base hinge (333) with the proximal end of the third support leg connected to the hinge and distal end of the third support leg connected to a third wheel (323), wherein a fourth support leg (354) is pivotably attached to the bottom side (320) via a fourth base hinge (334) with the proximal end of the fourth support leg connected to the hinge and distal end of the fourth support leg connected to a fourth wheel (324), wherein the first base hinge (331) and third based hinge (333) are near the fourth side (101) of the pet cage (110) and the first base hinge (331) is opposite to the third base hinge (333), wherein the second base hinge (332) and fourth base hinge (334) are near the back side (104) of the pet cage (110) and the second base hinge (332) is opposite to the fourth base hinge (334), wherein the first base hinge (331) and the second base hinge (332) is aligned, wherein the third base hinge (333) and the fourth base hinge (334) is aligned; wherein the four wheels are pivotably moved between a retracted position and a deployed position, wherein in retracted position, the wheels are retracted to contact the bottom side (320), wherein in deployed position, the wheels are deployed to perpendicular to the bottom side (320) such that the pet carrier (10) can be pushed or dragged via the wheels.

9. The system of claim 8, wherein a first circular rim (341), a second circular rim (342), a third circular rim (343) and a fourth circular rim (344) are disposed on the bottom side (320), wherein when the wheels are in retracted position, the first wheel is stored within the first rim, the second wheel stored within the second rim, the third wheel is stored within the third rim and the fourth wheel is stored within the fourth rim, wherein each rim has a small groove to fit the support legs when the wheels are in retracted position.

10. The system of claim 1, wherein the system further comprises a removable handle (600), wherein the handle is a U-shape bracket with a first arm (610), a second arm (620) and a connecting arm (630), wherein the first arm (610) and second arm (620) have adjustable length with telescope means, wherein the first arm (610) has a proximal end (612) and distal end (614), wherein the second arm (620) has a proximal end (622) and distal end (624), wherein a connecting arm (630) connects the proximal end of the first arm to the proximal end of the second arm, wherein the distal end (614) of the first arm (610) is removable attached to the pet cage (110) with a first adjust knob (616), wherein the distal end (624) of the second arm (620) is removably attached to the pet cage (110) with a second adjust knob (626), wherein the knob is coaxially connected to a latch (640), wherein the latch is able to enter a slot (630) disposed on the first side and second side of the pet cage with a certain angle only, wherein after the insertion of the latch (640), the adjust know (616 or 626) is rotated to a different angle such that the latch (640) is trapped inside the pet cage and thus hold the first arm and second arm, wherein an additional first dent (632) and second dent (634) are disposed on the first side/second side of the pet cage, wherein the first dent (632) and second dent (634) are adaptive to snuggly receive the first know (642) and second know (644) such that the first/second arm is securely attached to the pet cage.

11. The system of claim 10, wherein the connecting arm (630) has a rubber grip layer (604) to enhance the grip when a user pushes the pet carrier.

12. The system of claim 1, wherein the system further comprises an external cup holder (130) attached on the back side (104) of the pet cage (110), wherein the cup holder (130) comprises a first circular cavity (132), a second circular cavity (134) and a third cavity (136) disposed between the first circular cavity (132) and a second circular cavity (134).

13. The system of claim 1, wherein the system further comprises at least one recessed seat belt hook (124), wherein the recessed seat belt hook (124) is disposed on the first side, or second side or both sides of the pet cage (110), wherein the recessed seat belt hook (124) is adaptive to receive a vehicle's seat belt (502) such that the pet carrier itself is able to be secured within vehicle using the vehicle's seat belt.

14. The system of claim 1, wherein the system further comprises at least one LED light (710) disposed on the pet cage (110) on the front side (101) or at least one LED light (720) disposed on the cage base (310).

\* \* \* \* \*